US011624303B1

(12) United States Patent
Wendling et al.

(10) Patent No.: US 11,624,303 B1
(45) Date of Patent: Apr. 11, 2023

(54) DECELERATION FUEL CUT-OFF ENABLED REGENERATION FOR GAS PARTICULATE FILTER

(71) Applicant: GM GLOBAL TECHNOLOGY OPERATIONS LLC, Detroit, MI (US)

(72) Inventors: Timothy Wendling, New Lothrop, MI (US); Shubham Gupta, Ann Arbor, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/651,983

(22) Filed: Feb. 22, 2022

(51) Int. Cl.
| | | |
|---|---|---|
| *F01N 3/02* | (2006.01) | |
| *F02D 41/02* | (2006.01) | |
| *F02D 41/00* | (2006.01) | |
| *F02D 41/40* | (2006.01) | |
| *F02P 5/15* | (2006.01) | |

(Continued)

(52) U.S. Cl.
CPC ............. *F01N 3/023* (2013.01); *B60W 10/06* (2013.01); *B60W 10/10* (2013.01); *B60W 20/16* (2016.01); *B60W 20/40* (2013.01); *B60W 50/0205* (2013.01); *F02D 13/0234* (2013.01); *F02D 41/0002* (2013.01); *F02D 41/0255* (2013.01); *F02D 41/123* (2013.01); *F02D 41/402* (2013.01); *F02P 5/1502* (2013.01); *F02D 2200/0802* (2013.01); *F02D 2200/0812* (2013.01); *F02D 2200/501* (2013.01)

(58) Field of Classification Search
CPC ...... F02D 13/02; F02D 13/0234; F02D 41/00; F02D 41/0002; F02D 41/02; F02D 41/0255; F02D 41/123; F02D 41/402; F02P 5/1502; B60W 10/06; B60W 10/10; B60W 20/16; B60W 20/40; B60W 50/0205; F01N 3/023
See application file for complete search history.

(56) References Cited

U.S. PATENT DOCUMENTS

| | | | |
|---|---|---|---|
| 8,850,798 B2 * | 10/2014 | Brown | F02D 41/029 60/274 |
| 9,394,815 B2 * | 7/2016 | Brenneis | F02M 43/00 |

(Continued)

FOREIGN PATENT DOCUMENTS

| | | |
|---|---|---|
| DE | 102019120776 A1 | 4/2010 |
| DE | 202015008072 U1 | 2/2017 |

(Continued)

*Primary Examiner* — John Kwon
*Assistant Examiner* — Johnny H Hoang
(74) *Attorney, Agent, or Firm* — Lorenz & Kopf LLP (57) ABSTRACT

Systems and methods provide deceleration fuel cutoff regeneration of a gas particulate filter. A powertrain system includes an exhaust system containing the gas particulate filter, which is configured to collect particulate matter from an exhaust gas stream of the powertrain system. A temperature sensor is configured to monitor a temperature of the gas particulate filter. A loading monitor, such as a sensor and/or a model, is configured to provide a loading input of particulate loading of the gas particulate filter. At least one controller is configured to: determine, by comparing the loading input to stored values, whether the gas particulate filter requires the regeneration; effect a warmup of the gas particulate filter when the determination shows the gas particulate filter requires the regeneration; and initiate the regeneration when a value received from the temperature sensor meets a minimum threshold level.

20 Claims, 4 Drawing Sheets

(51) Int. Cl.
*F01N 3/023* (2006.01)
*B60W 20/16* (2016.01)
*B60W 20/40* (2016.01)
*B60W 50/02* (2012.01)
*F02D 13/02* (2006.01)
*B60W 10/10* (2012.01)
*B60W 10/06* (2006.01)
*F02D 41/12* (2006.01)

(56) References Cited

U.S. PATENT DOCUMENTS

| | | | |
|---|---|---|---|
| 9,593,648 B2 * | 3/2017 | Yacoub | F01N 3/30 |
| 2003/0145582 A1 * | 8/2003 | Bunting | B60K 6/46 |
| | | | 180/65.23 |
| 2004/0237513 A1 * | 12/2004 | Bunting | B60K 6/543 |
| | | | 903/917 |
| 2005/0060991 A1 * | 3/2005 | Tsutsumoto | F02D 41/0245 |
| | | | 60/297 |
| 2005/0204731 A1 * | 9/2005 | Nakano | F02D 41/0245 |
| | | | 60/285 |
| 2010/0281852 A1 * | 11/2010 | Conrad | F02D 41/029 |
| | | | 60/274 |
| 2014/0208944 A1 * | 7/2014 | Brenneis | F02D 41/029 |
| | | | 95/20 |
| 2015/0240695 A1 * | 8/2015 | Tylutki | F01N 3/103 |
| | | | 60/277 |
| 2018/0283254 A1 * | 10/2018 | Zhang | F01N 13/008 |

FOREIGN PATENT DOCUMENTS

| | | |
|---|---|---|
| DE | 202017001691 U1 | 7/2018 |
| DE | 102008042738 A1 | 2/2020 |

* cited by examiner

DECELERATION FUEL CUT-OFF ENABLED REGENERATION FOR GAS PARTICULATE FILTER

INTRODUCTION

The present disclosure generally relates to the regeneration of a gas particulate filter (GPF) in the exhaust system of a gasoline engine, and more specifically to enablement of the regeneration which is effected by deceleration fuel cut-off (DFCO).

Gasoline engines may be equipped with exhaust systems that include GPFs to remove particulate matter from the exhaust gas stream. One such type of engine is a gasoline direct injection engine. The GPF may include a housing containing a multiple passageway substrate/media that captures particles as the exhaust gas passes through. One such substrate may include a honeycomb-like structure where the exhaust gases pass through the cells. The substrate/media is regenerated to remove built-up particles such as by subjecting the unit to conditions, including temperatures and gas compositions, to burn off the particles.

GPF regeneration may be accomplished in a passive manner with particle capture and unit regeneration occurring on an ongoing basis during operation of the associated vehicle/engine in normal drive cycles. When a gasoline engine is paired with one or more electric traction motors, such as in a hybrid arrangement, the gasoline engine may be operated intermittently, and may be shut-down when regeneration may otherwise be accomplished. Accordingly, purely passive regeneration may be insufficient to provide a preferred level/timing of regeneration.

For example, when passive regeneration is not routinely initiated, an active regeneration cycle may be required. An active regeneration cycle may require operating the vehicle's powertrain outside of a normal drive cycle in an invasive, controlled way, which is undesirable. When active regeneration is initiated under certain circumstances, such as during a first number of kilometers during which the associated vehicle is operated, an uplift (Ki) factor may be added to the vehicle's certification. The Ki factor represents a ratio of emissions from cycles with regeneration to emissions from all cycles and may involve a multiplier that effects an upward adjustment of the vehicle's measured emissions for certification purposes. As such, the avoidance of Ki factor application is desirable.

Accordingly, it is desirable to provide improved methods and systems that enable passive GPF regeneration in a hybrid propulsion arrangements, while avoiding the need to apply a Ki factor. Furthermore, other desirable features and characteristics of the present invention will become apparent from the subsequent detailed description and the appended claims, taken in conjunction with the accompanying drawings and the foregoing technical field and background.

SUMMARY

Systems and methods are disclosed for deceleration fuel cutoff regeneration of a gas particulate filter. In a number of embodiments, a powertrain system enables regeneration of a gas particulate filter and includes an exhaust system containing the gas particulate filter, which is configured to collect particulate matter from an exhaust gas stream of the powertrain system. A temperature sensor is configured to monitor a temperature of the gas particulate filter. A loading monitor, such as a sensor and/or a model, is configured to provide a loading indicative input of particulate loading of the gas particulate filter. At least one controller is configured to: determine, by comparing the loading input to stored values, whether the gas particulate filter requires the regeneration; effect a warmup of the gas particulate filter when the determination shows the gas particulate filter requires the regeneration; and enable the regeneration when a value received from the temperature sensor meets a minimum threshold level.

In additional embodiments, the powertrain system includes a gasoline engine, where the gasoline engine is configured to operate as an air pump without fuel in a deceleration fuel cutoff condition when the enabled regeneration is executed.

In additional embodiments, the controller, prior to initiating the regeneration, is configured to: determine whether any sensor faults are active, including for the temperature sensor and for the loading monitor; and determine whether the temperature of the gas particulate filter is above a calibrated temperature where regeneration of the gas particulate filter is feasible.

In additional embodiments, the controller, prior to initiating the regeneration, is configured to determine whether a speed of a vehicle in which the powertrain system is disposed is above a calibrated speed, where the calibrated speed is a minimum speed at which deceleration of the vehicle will feasibly result in regeneration of the gas particulate filter.

In additional embodiments, the powertrain system includes an engine with a throttle controlling air supplied to the engine, and at least one injector controlling fuel supplied to the engine. The controller is configured to initiate operation of the engine to accelerate the warmup of the gas particulate filter by altering an air/fuel ratio supplied to the engine through operation of the throttle and the at least one injector.

In additional embodiments, injectors are used to control fuel supplied to the engine, wherein the controller is configured to initiate operation of the engine to accelerate the warmup of the gas particulate filter by supplying split injections through the injectors to accelerate the warmup of the gas particulate filter.

In additional embodiments, at least one spark plug controls the initiation of combustion in the engine, where the controller is configured to initiate operation of the engine to accelerate the warmup of the gas particulate filter by altering timing of the combustion via the at least one spark plug.

In additional embodiments, valves control air supplied to the engine and exhaust from the engine, where the controller is configured to initiate operation of the engine to accelerate the warmup of the gas particulate filter by altering phaser angles of the valves.

In additional embodiments, the powertrain system includes an internal combustion engine and an electric motor. A transmission system couples and decouples the internal combustion engine with a driveline. The controller is configured to couple the internal combustion engine with the driveline through the transmission system during the regeneration of the gas particulate filter.

In additional embodiments, the powertrain system includes an internal combustion engine and an electric motor, where the controller is configured to effect the regeneration of the gas particulate filter through a deceleration fuel cutoff of the internal combustion engine.

In a number of other embodiments, a method enables regeneration of a gas particulate filter of a powertrain system by deceleration fuel cutoff. A gas particulate filter collects particulate matter from an exhaust gas stream of the powertrain system. A temperature sensor monitors a temperature of the gas particulate filter. A loading monitor, such as a pressure sensor and/or a model, provides a loading input of particulate loading of the gas particulate filter. The controller determines, by comparing the loading input to stored values, whether the gas particulate filter requires a regeneration. The controller effects a warmup of the gas particulate filter, when the determination shows the gas particulate filter requires the regeneration. The controller enables the regeneration when a value received from the temperature sensor meets a minimum threshold level.

In additional embodiments, the controller operates a gasoline engine as an air pump without fuel in a deceleration fuel cutoff condition when the regeneration is executed.

In additional embodiments, the controller determines, prior to initiating the regeneration, whether any sensor faults are active, including for the temperature sensor and for the loading monitor. In addition, the controller determines whether the temperature of the gas particulate filter is above a calibrated temperature where regeneration of the gas particulate filter is feasible.

In additional embodiments, the controller determines, prior to initiating the regeneration, whether a speed of a vehicle in which the powertrain system is disposed is above a calibrated speed. The calibrated speed is a minimum speed at which deceleration of the vehicle will feasibly result in regeneration of the gas particulate filter.

In additional embodiments, an engine in the powertrain system has a throttle controlling air supplied to the engine, and has injectors controlling fuel supplied to the engine. The controller initiates operation of the engine to accelerate the warmup of the gas particulate filter by altering an air/fuel ratio supplied to the engine, by operation of the throttle and the injectors.

In additional embodiments, an engine is provided in the powertrain system with injectors. The injectors control fuel supplied to the engine. The controller operates the engine to accelerate the warmup of the gas particulate filter by supplying split injections through the injectors.

In additional embodiments, an engine is provided in the powertrain system with at least one spark plug. The controller, through the at least one spark plug, controls initiation of combustion in the engine. The controller initiates operation of the engine to accelerate the warmup of the gas particulate filter by altering timing of the combustion via the at least one spark plug.

In additional embodiments, an engine is provided in the powertrain system with valves controlling air supplied to the engine and gases from the engine. The controller initiates operation of the engine to accelerate the warmup of the gas particulate filter.

In additional embodiments, an internal combustion engine is provided in the powertrain system. An electric motor is provided in the powertrain system. A transmission system is provided in the powertrain system for coupling and decoupling the internal combustion engine with a driveline. The controller couples the internal combustion engine with the driveline through the transmission system during the regeneration of the gas particulate filter.

In a number of other embodiments, a vehicle includes a hybrid powertrain with an internal combustion engine, an electric motor, and an exhaust system extending from the internal combustion engine. A gas particulate filter is disposed in the exhaust system to collect particulate matter. A temperature sensor is configured to monitor a temperature of the gas particulate filter. A loading monitor is configured to provide a loading input of particulate loading of the gas particulate filter. A controller is configured to: determine, by comparing the loading input to stored values, whether the gas particulate filter requires a regeneration; effect a warmup of the gas particulate filter, when the determination shows the gas particulate filter requires the regeneration; enable the regeneration when a value received from the temperature sensor meets a minimum threshold level; and initiate the regeneration of the gas particulate filter by deceleration fuel cutoff, where the internal combustion engine is operated as an air pump to supply oxygen to the gas particulate filter.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit, an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of flow systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In general, the current disclosure describes systems and methods that initiate DFCO requests to effect passive GPF regeneration. When conditions meet certain criteria, a warmup cycle is initiated to raise the temperature of the engine and the GPF. Operative engine conditions (e.g. those that change operation of the engine), may be initiated to assist with the warmup. As temperatures increase, a determination is made of whether the warmup is complete. The warmup is considered complete, for example, when GPF temperature is at a sufficient level to support effective passive regeneration. When a warmup complete mode is entered, a DFCO request is initiated to effect the passive regeneration. GPF temperature is monitored to ensure it remains at sufficiently high levels for the regeneration. When the particulate load of the GPF falls below a predetermined level, the DFCO request is terminated and the passive regeneration is complete. To effect the regeneration, the DFCO request may be supplied to the engine's controller, and/or the hybrid system controller, which determine the timing and initiation of the DFCO cycle. As a result, the GPF is regenerated passively during normal drive cycles, which may include select engine operation, but without a need for active regeneration.

The current disclosure provides systems and methods to passively effect GPF regeneration during normal driving cycles of a hybrid vehicle, avoiding the need to effect active regeneration, at least for the first 4000 kilometers of vehicle operation and potentially for a much longer period. Vehicle coast-down may be a desirable time to effect passive regeneration. When a gasoline engine is the sole powerplant for a vehicle in non-hybrid arrangements, the engine remains coupled with the driveline through the transmission during driving. In such an arrangement, the engine's injectors may be shut off during coast-down with the engine operating as an air pump without fuel. During these DFCO conditions, the engine pumps the air through the exhaust system, which together with high temperatures in the GPF passively burns off accumulated particulate. With a hybrid arrangement, the gasoline engine may be decoupled from the driveline/transmission when not needed. For example, when the hybrid vehicle is coasting, the gasoline engine may be shut down and the vehicle's momentum may be used to charge the hybrid system's batteries. Because the gasoline engine is shut down, it cannot operate as an air pump. As a result, insufficient oxygen may be delivered to the GPF to effect regeneration. Accordingly, in a hybrid vehicle with a GPF, the current disclosure provides methods and systems to effect passive regeneration during a normal drive cycle, when the engine might otherwise be shut down and decoupled from the driveline.

Figure 1:
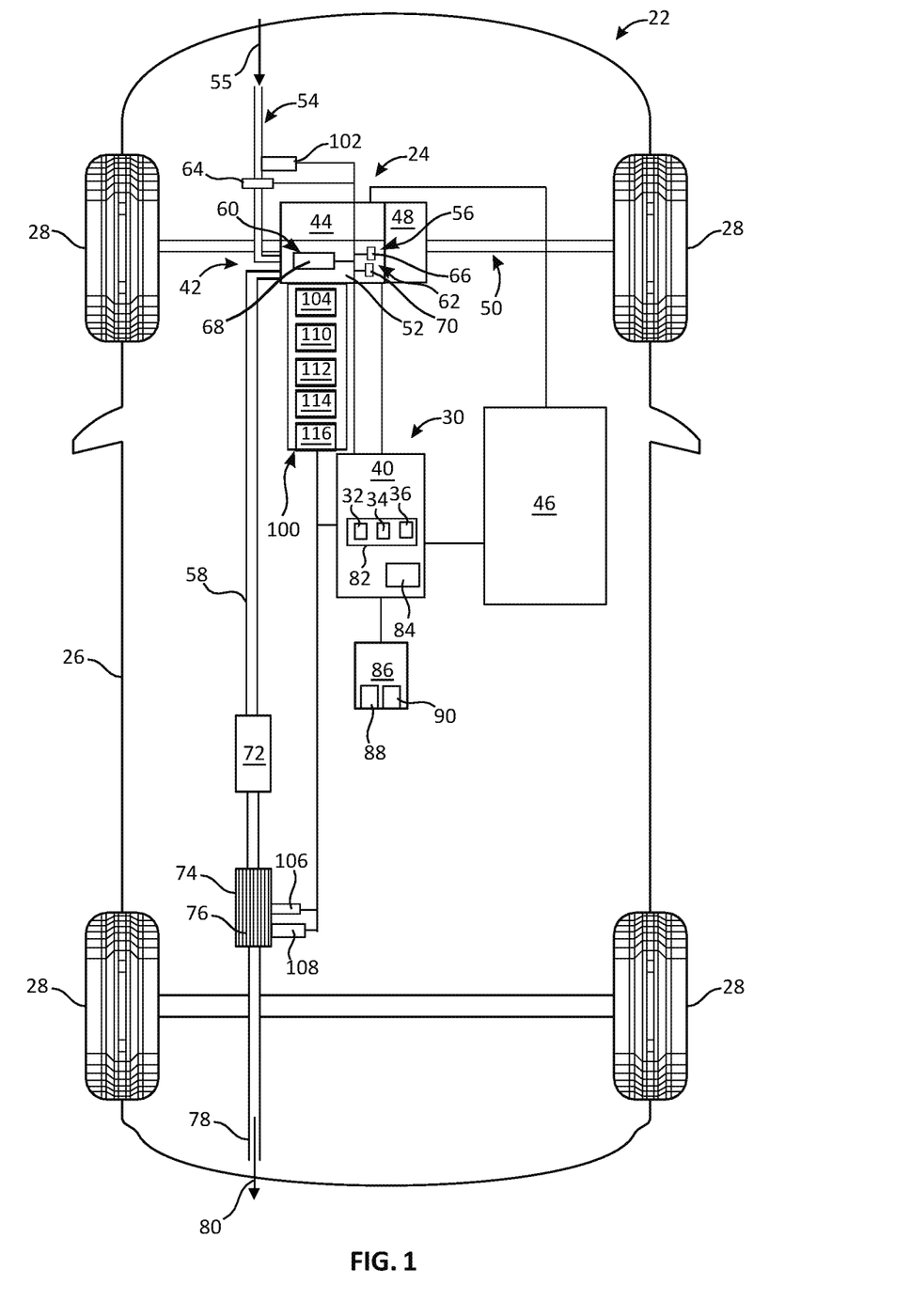
FIG. 1 is a functional diagram of a vehicle that includes a hybrid powertrain and a control system for initiating and carrying out a DFCO for GPF regeneration, in accordance with an exemplary embodiment.

Referring to FIG. 1, a vehicle 22 is illustrated having a hybrid powertrain 24 according to an exemplary embodiment. As described in greater detail below, the vehicle 22 includes control approaches that initiate passive GPF regeneration in response to parameters of the hybrid powertrain 24. In a number of embodiments, the vehicle 22 generally includes a body 26 with a number of wheels 28. The body 26 substantially encloses the other components of the vehicle 22. The wheels 28 are each rotationally coupled to the body 26 near a respective corner. The vehicle 22 may be any one of a number of different types of automobiles, such as, for example, a sedan, a wagon, a truck, or a sport utility vehicle (SUV), and may be two-wheel drive (i.e., rear-wheel drive or front-wheel drive), four-wheel drive or all-wheel drive.

The vehicle 22 includes a control system 30 that may include any number of controllers for various systems and functions. The controllers may be stand-alone, separate and communicatively coupled together, or integrated together. For purposes of the current disclosure, the control system 30 includes a DFCO module 32, an engine control module 34, and a hybrid system control module 36. The DFCO module 32, the engine control module 34, and the hybrid system control module 36 may be embodied in any number of individual controllers that cooperate together to initiate DFCP requests and to carry out those requests. For efficiency, the DFCO module 32, the engine control module 34, and the hybrid system control module 36 will be described as part of one control system 30 embodied in one controller 40, which is to be understood as embodying one or more controllers.

In the exemplary embodiment, the vehicle 22 is s hybrid-electric vehicle, and the hybrid powertrain 24 generally includes an engine system 42, such as a gasoline direct-injection engine system, at least one electric motor 44, an energy source such as a battery pack 46, and a transmission system 48, all configured to drive the wheels 28. As will be appreciated by one skilled in the art, the electric motor(s) 44 may be associated with the transmission system 48 as an integral or separate coupled component. The transmission system 48 enables separately or jointly coupling the engine system 42 and/or the electric motor(s) 44 with the wheels 28 through the driveline 50 of the vehicle 22.

The engine system 42 generally includes a number of components and subsystems including an engine 52, an intake system 54, a fuel system 56, an exhaust system 58, a valve system 60, and an ignition system 62. In this embodiment, the engine 52 is an internal combustion engine and specifically a direct injection gasoline engine. The intake system 54 delivers air 55 and controls the air's mass flow rate to the engine 52 via a throttle 64. The fuel system 56 delivers fuel to the engine 52 and controls its timing and amount via a number of injectors 66. The valve system 60 includes a number of valves 68 to control the flow of air/gases into and out of the engine 52. The ignition system 62 includes a number of spark plugs 70 that initiate combustion in the engine 52.

The exhaust system 58 conveys combustion gases from the engine 52 and includes aftertreatment devices such as a three-way catalytic converter 72 and a GPF 74. The aftertreatment devices may be arranged in any of several different configurations. For example, the GPF 74 may be downstream from the three-way catalytic converter 72 as shown, or may be upstream therefrom in other embodiments. In some embodiments, the GPF 74 may internally include the three-way catalyst with or without a separate three-way catalytic converter 72. The three-way catalytic converter 72, and/or the catalyst in the GPF 74 is configured to converting hydrocarbons, carbon monoxide and nitrogen oxides to innocuous elements or compounds. The GPF 74 captures particulate matter an includes an internal substrate 76. The exhaust system 58 directs the exhaust gases 80 through the aftertreatment devices and out through a tailpipe 78.

The control system 30, as depicted in FIG. 1, includes the controller(s) 40, which may be refereed to in the singular form for simplicity, and in general, comprise a computer system. Generally, the controller 40 is configured to receive inputs from various sensors which are configured to generate signals in proportion to various physical input parameters associated with the vehicle 22, the hybrid powertrain 24, their subsystems, and other interrelated systems. It will be appreciated that operations of the vehicle 22 and the hybrid powertrain 24 are closely related and overlapping.

In the depicted embodiment, the controller 40 includes at least one processor 82 and a memory device 84, and is coupled with a storage device 86. The processor 82 performs the computation and control functions of the controller 40, and may comprise any type of processor or multiple processors, single integrated circuits such as a microprocessor, or any suitable number of integrated circuit devices and/or circuit boards working in cooperation to accomplish the functions of a processing unit. During operation, the processor 82 executes one or more programs 88 and may use data 90, each of which may be contained within the storage device 86 and as such, the processor 82 controls the general operation of the controller 40 in executing the processes described herein, such as the processes described further below.

The memory device 84 may be any type of suitable memory. For example, the memory device 84 may include volatile and nonvolatile storage in read-only memory, random-access memory, and keep-alive memory comprising a persistent or non-volatile memory that may be used to store various operating variables while the processor 82 is powered down. The memory device 84 may be implemented using any of a number of known memory devices such as programmable read-only memory, erasable PROM, electrically erasable PROM, flash memory, or any other electric, magnetic, optical, or combination memory devices capable of storing data, some of which represent executable instructions, used by the controller 40. In certain embodiments, the memory device 84 may be located on and/or co-located on the same computer chip as the processor 82. In the depicted embodiment, the memory device 84 may store the above-referenced programs 88 along with one or more stored values of the data 90 such as for short-term data access.

The storage device 86 stores data, such as for long-term data access for use in automatically operating the vehicle 22, the hybrid powertrain 24, the control system 30 and related systems. The storage device 86 may be any suitable type of storage apparatus, including direct access storage devices such as disk drives, flash systems, or others. In one exemplary embodiment, the storage device 86 comprises a source from which the memory device 84 receives the programs that execute one or more embodiments of one or more processes of the present disclosure, such as the steps of the process (and any sub-processes thereof) described further below. In another exemplary embodiment, the programs 88 may be directly stored in and/or otherwise accessed by the memory device 84.

The programs 88 represent executable instructions, used by the electronic controller 40 in processing information and in controlling the hybrid powertrain 24, the vehicle 22 and their systems/subsystems. The instructions may include one or more separate programs, each of which comprises an ordered listing of executable instructions for implementing logical functions. The instructions, when executed by the processor 82 support the receipt and processing of signals such as from the various sensors, and the performance of logic, calculations, methods and/or algorithms for automatically controlling the components and systems of the hybrid powertrain 24 and the vehicle 22. The processor 82 may generate control signals to automatically control various components and systems based on the logic, calculations, methods, and/or algorithms.

As will be appreciated, the data storage device 86 may be part of the controller 40, separate from the controller 40, part of one or more other controllers, or part of multiple systems. The memory device 84 and the storage device 86 work together with the processor 82 to access and use the programs 88 and the data 90. While the components of the control system 30 are depicted as being part of the same system, it will be appreciated that in certain embodiments, these features may comprise multiple systems. In addition, in various embodiments the control system 30 may comprise all or part of, and/or may be coupled to, various other vehicle devices and systems.

The control system 30 controls operation of the hybrid powertrain 24 to deliver the desired operational performance. In general, the controller 40 uses the available inputs, including those from the various sensors, actuators and systems identified herein, of the control system 30 with parameter data to effectively govern various functions of the hybrid powertrain 24 and the vehicle 22. For example, based on the data input, the controller 40 precisely calculates and controls operation of the hybrid powertrain 24.

The sensors associated with the control system 30 include, but are not limited to, an ambient air temperature sensor 102, a vehicle speed sensor 104, a GPF temperature sensor 106, a GPF load ($\Delta P$) sensor 108, a pedal (throttle) position sensor 110, a crank (engine speed) sensor 112, a coolant temperature sensor 114, and an oil temperature sensor 116. The vehicle speed sensor, the throttle position sensor 110, the engine speed sensor 112, the coolant temperature sensor 114, and the oil temperature sensor 116 are schematically illustrated as a part of a sensor suite 100 associated with the hybrid powertrain 24 with their individual positions in the hybrid powertrain 24 or its related systems varying. The ambient air temperature sensor 102 provides a signal to the control system 30 representing the temperature of the outside air, and may disposed to monitor air 55 entering the intake system 54. The vehicle speed sensor 104 provides a signal representative of the speed at which the vehicle 22 is travelling, and may be located proximate the driveline 50 at one of various locations to indicate vehicle speed. The GPF temperature sensor 106 provides a signal representative of the temperature inside the GPF 74. The $\Delta P$ sensor 108 provides a signal representative of the particulate loading of the GPF 74, such as by monitoring pressure drop therethrough. The pedal position sensor 110 provides a signal representative of the torque request on the hybrid powertrain 24 and may monitor the position of the operator controlled throttle foot pedal, or of another part of the throttle system. The engine speed sensor 112 provides a signal representative of the rotating speed of the engine 52, such as by monitoring the RPMs of its crank. The coolant temperature sensor 114 provides a signal representative of the temperature of the engine 52 and may be disposed in the coolant system thereof. The oil temperature sensor 116 may also be included to monitor the temperature of the oil in the crankcase in the engine 52. It will be appreciated that operation of the hybrid powertrain 24 and of the vehicle 22 may involve many other sensors that are not described or illustrated herein. The various sensors provide signals and/or information pertaining to parameter measurements to the controller 40 for processing and for use in controlling the hybrid powertrain 24 and/or of the vehicle 22 through its various actuators.

The actuators associated with the control system 30 include, but are not limited to, a throttle 64, the fuel system 56 including the injectors 66, the valve system 60 including the valves 68, the ignition system 62 including the spark plugs 70, and the motor 44. The throttle 64 controls the mass air flow rate supplied to the engine 52 through the intake system 54. The injectors 66 control fuel flow to the engine 52, and one may be provided for each cylinder of the engine 52. The valves 68 control air 55 entry to each cylinder of the engine 52 and exhaust gas exit therefrom with a plural number for each cylinder of the engine 52. The spark plugs 70 control the timing of combustion initiation in the individual cylinders of the engine 52. The motor 44 provides torque in propelling the vehicle 22 together with, or separate from, the engine 52. It will be appreciated that operation of the hybrid powertrain 24 and of the vehicle 22 may involve many other actuators that are not described or illustrated herein.

Figure 2:
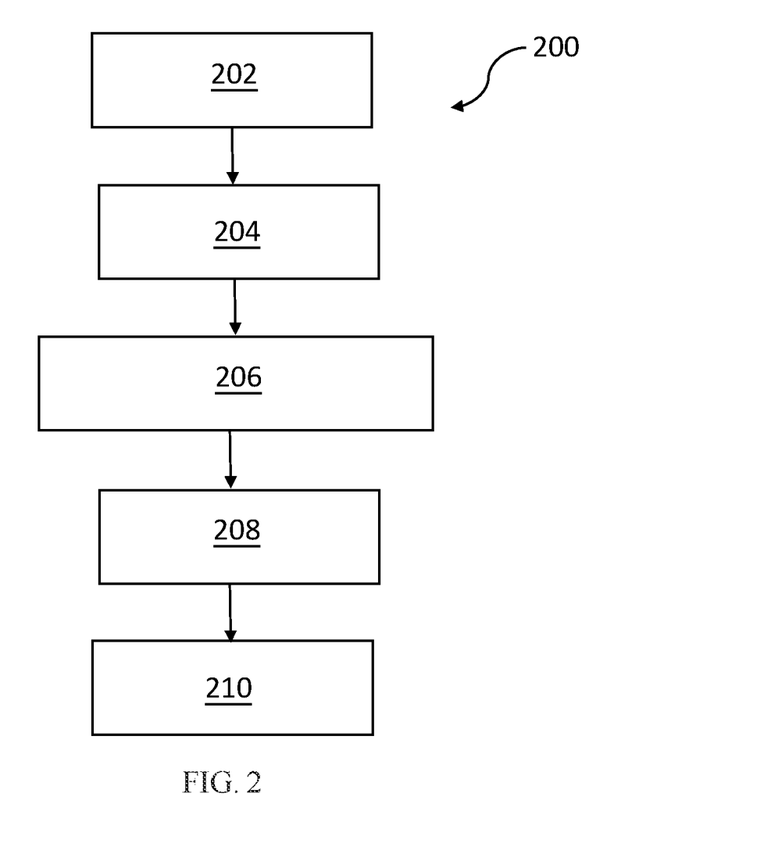
FIG. 2 is a diagram of a DFCO model for the vehicle and hybrid powertrain of FIG. 1, in accordance with an exemplary embodiment.

Referring to FIG. 2, DFCO enablement and GPF regeneration are depicted as a series of high level states by a DFCO model 200. The DFCO model 200 generally includes GPF/DFCO evaluation 202, DFCO warmup 204, DFCO warmup complete 206, DFCO enablement 208, and DFCO execution 210. Processing the DFCO model 200 involves moves through the first three states (GPF/DFCO evaluation 202, DFCO warmup 204, DFCO warmup complete 206), under specific entry and exit conditions and then the GPF 74 is ready for regeneration in the fourth state. At the point of DFCO enablement 208, the DFCO model 200 requests a DFCO such as for execution by the hybrid system control module 36 and/or the engine control module 34. The DFCO model 200 uses specific calibrated engine operating conditions to enable on-cycle regeneration of the GPF 74 avoiding undesirable Ki factor effects. The GPF/DFCO evaluation 202 determines whether the GPF 74 is ready for a regeneration and whether other parameters support DFCO. The DFCO warmup prepares the GPF 74 for regeneration. At the DFCO warmup complete 206 state, the GPF 74 is warmed for regeneration. At the DFCO enablement 208 state, the control system 30 initiates a DFCO request. At the DFCO execution 210 state, the control system 30, such as by the hybrid control module 36 and/or the engine control module 34, executes a DFCO to regenerate the GPF 74 at the first available opportunity.

Figure 3:
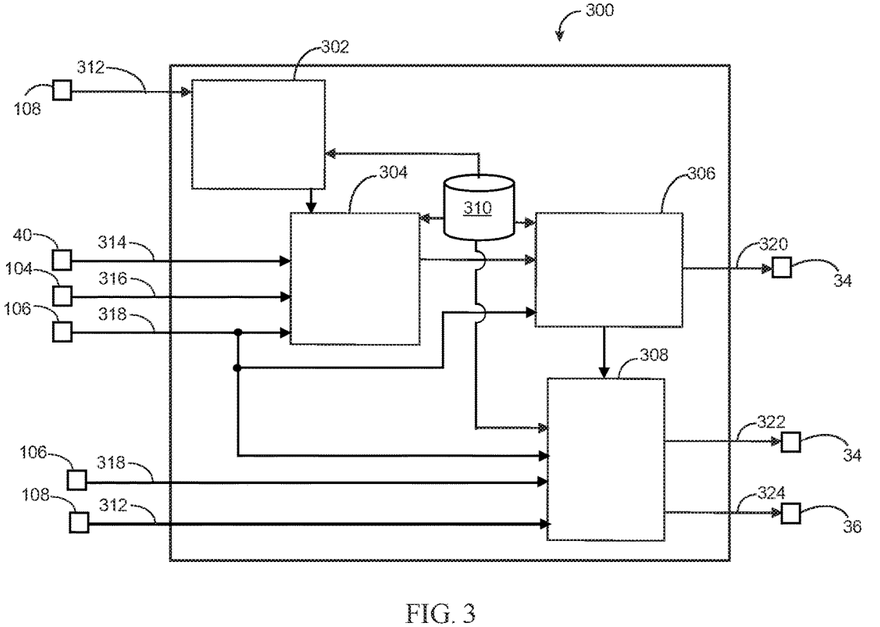
FIG. 3 is a data flow diagram of the DFCO model of FIG. 2 within the context of the control system of FIG. 1, in accordance with an exemplary embodiment.

The sensors and the actuators illustrated in FIG. 1 are used to determine timing of, and initiation of, a DFCO request, and to effect a resulting DFCO to effect a passive regeneration of the GPF 74, when appropriate. Referring to FIG. 3 concurrently with FIG. 4, the control system 30 and its operation, or a part thereof, may be embodied in a control structure 300 generally representing the DFCO module 32, and in a process 400. The structure 300 may include a number of modules/submodules for carrying out the process 400 to provide the controller 40 with useful information to control the hybrid powertrain 24 including the exhaust system 58, which may be done as part of the control of the vehicle 22. In various embodiments, the control structure 300 generally includes a GPF evaluation module 302, a DFCO evaluation module 304, a DFCO warmup module 306, a DFCO execution module 308, and a datastore 310, which may generally represent the storage device 88.

Figure 4:
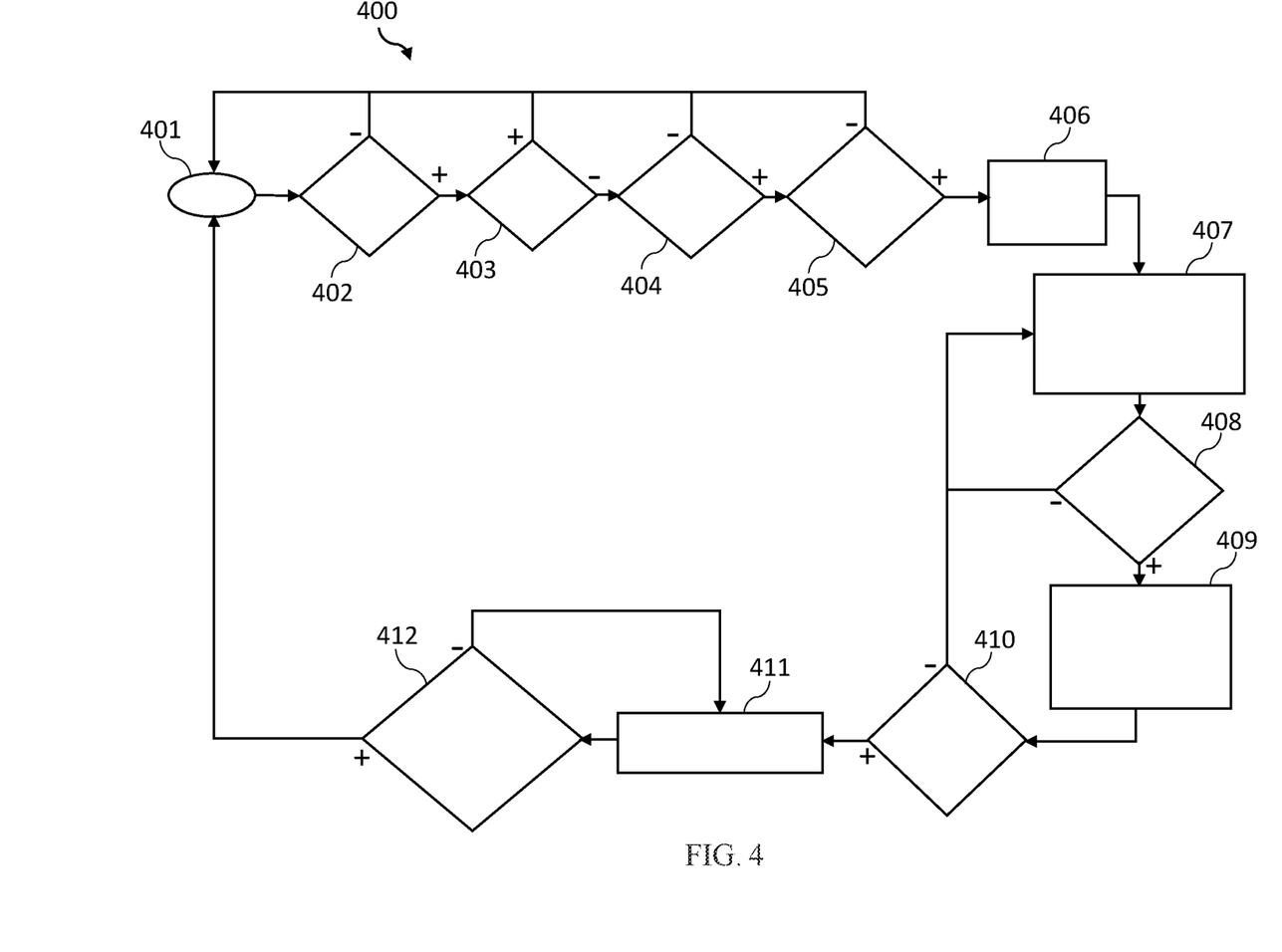
FIG. 4 is a flowchart of a process for initiating a DFCO request that may be used in connection with the vehicle and the control system of FIG. 1, in accordance with an exemplary embodiment.

The control structure 300 may include any number of additional modules to control aspects of the hybrid powertrain 24, the vehicle 22 and/or other systems independent of, or in coordination with the modules of the control structure 300. For example, the modules (not shown) that determine whether to operate the engine 52 or the motor 44 may use the calculations and outputs of the control structure 300 in determining the appropriate torque input device at any given time. During operation of the vehicle 22, the GPF evaluation module 302 determines 402, after the start 401 of the process 400, whether the particulate load of the substrate 76 in the GPF 74 is above a threshold. For example, when the ΔP sensor 108, delivers a signal 312 to the GPF evaluation module 302 that the pressure drop across the GPF 74 is above the threshold pressure, where the threshold pressure may be obtained from the datastore 310 and is indicative of a need to effect a regeneration of the GPF 74, the conditional determination 402 is met. When the determination 402 is negative, and the GPF 74 is not in need of regeneration, the process 400 returns to start 401.

The particulate load of the GPF 74 may be determined 402 by a loading monitor, for example by using data from ΔP sensor 108 such as by comparing the input data to data in the datastore 310, which may be stored in a retrievable format such as in a lookup table with individual values correlated with various conditions. In other embodiments a particulate load model may be developed and stored in the datastore 310 as at least a part of the loading monitor for supplementing the determination 402, or for independently making the determination 402. The model may be an algorithm developed, such as by using characteristic testing and/or computational modelling software, to indicate the current particulate load of the GPF 74 based on past operation of the hybrid powertrain 24. The model may use inputs from the coolant temperature sensor 114, the engine speed sensor 112, the ambient temperature sensor 102 and/or the oil temperature sensor 116. In embodiments where the model alone is used as the loading monitor to indicate particulate loading, the ΔP sensor 108 may be omitted. The model may be executed by the GPF evaluation module 302 using the inputs from the coolant temperature sensor 114, the engine speed sensor 112, the ambient temperature sensor 102 and/or the oil temperature sensor 116, along with the algorithm and other data, such as from the datastore 310, to predict the particulate loading of the GPF 74. In sum, the determination 402 may be made using the loading monitor based on data from the ΔP sensor 108 and in some embodiments may be confirmed or replaced by the results of the model.

Following a positive determination 402, the GPF evaluation module 302 signals the DFCO evaluation module 304, and the process 400 continues to determine 403, such as by the DFCO evaluation module 304, whether any active faults are present for the GPF temperature sensor 106 or the ΔP sensor 108. Any active faults may be indicated by data stored in the datastore 310 or otherwise received via a signal 314 from other parts of the controller 40. An active fault indicates that the sensor readings may be unreliable and the process 400 will return and not proceed until all active faults are absent, cleared or corrected. When an active fault is not present, the process 400 continues to determine 404, such as by the DFCO evaluation module 304 using a signal 316 from the vehicle speed sensor 104, whether the speed of the vehicle 22 is above a calibrated speed, which may be retrieved from the datastore 310. The calibrated speed is a minimum speed at which deceleration of the vehicle 22 will effectively/feasibly regenerate the GPF 74 during fuel cutoff and deceleration. When the speed of the vehicle 22 is not above the calibrated speed, meaning the determination 404 is negative, the process 400 returns and will proceed only when the speed of the vehicle 22 is above the calibrated speed.

When the speed of the vehicle 22 is above the calibrated speed, the process 400 proceeds to determine 405 whether the temperature of the GPF 74 is above a calibrated temperature. For example, the DFCO evaluation module 304, using a signal 318 from the GPF temperature sensor 106, determines whether the GPF 74 is at a minimum temperature, which may be retrieved from the datastore 310, to enable regeneration of the GPF 74 following a warmup period. In other words, the minimum temperature is a temperature above which regeneration of the GPF 75 is feasible, considering an additional warmup phase to be carried out by the process 400. When the temperature of the GPF 74 is not above the calibrated temperature, meaning the determination 405 is negative, the process 400 returns and will proceed only when the temperature of the GPF 74 is above the calibrated temperature. For example, when the temperature of the GPF 74 is at or near ambient temperature, the process 400 does not proceed.

When the temperature of the GPF 74 is above the calibrated temperature, the process 400 proceeds to enter a DFCO warmup routine 406-410. For example, the DFCO warmup module 306 may initiate a DFCO warmup of the engine 52 and as a result, of the GPF 74. In general, the DFCO warmup routine 406-410, such as carried out through the DFCO warmup module 306, monitors the temperature of the GPF 74 through the signal 318 from the GPF temperature sensor 106, delivers outputs via signals 320 to the engine 52/engine control module 34, and references input from the datastore 310.

At entry 406 to the DFCO warmup routine, the determinations 402-405 have all resulted in positive outcomes and their conditions have been met. The entry 406 starts or continues operation of the engine 52, such as through the signals 320 to the engine 52/engine control module 34. The engine 52 is subjected to warmup control 407, as prompted by the DFCO warmup module 306 through the signals 320, to operate in an accelerated warmup mode/state. For example, the signals 320 may prompt a change of the air/fuel ratio (equivalence ratio, EQR) of the operating engine 52 to raise the heat generated during combustion. For example, the position of the throttle 64 and/or the fuel supplied by the injectors 66 may be set so that the engine is operating at non-stoichiometric conditions to speed warmup. In another example, the fuel system 56 may be operated to deliver split injections of fuel through the injectors 66. With split injections, rather than using a single injection profile for an injector 66, two or more injection pulses are delivered with a delay dwell between the pulses. In another example, the timing of the spark delivered by the spark plugs 70 may be targeted to raise combustion temperatures. In another example, phaser angles may be changed to change the opening and closing of the valves 68 to raise exhaust temperatures. Any combination of EQR, split injection, spark timing, and/or phaser angle modifications may be employed by the DFCO warmup module 306 to effect the desired warmup of the GPF 74 during the warmup control 407. Feedback is monitored from the GPF temperature sensor 106 and a determination 408 is made as to whether the GPF 74 is at or above a threshold temperature sufficient to effect regeneration. When the determination 408 is negative, the warmup control 407 continues. When the determination is positive, meaning the temperature of the GPF 74 is above the threshold, the process 400 proceeds to enter 409 a DFCO warmup complete mode/state. At the DFCO warmup complete entry 409, The temperature of the GPF 74 is sufficiently high to feasibly effect regeneration of the GPF 74 under a DFCO.

The process 400 continues to monitor the temperature of the GPF 74 and again determines 410 whether the GPF 74 is at or above a threshold temperature sufficient to effect regeneration. When the determination 408 is negative, the warmup control 407 continues. When the determination is positive, meaning the temperature of the GPF 74 is above the threshold, the process 400 proceeds to DFCO enable 411. For example, the DFCO warmup module 306 signals the DFCO execution module 308 (such as a submodule of the DFCO module 32), which issues a DFCO request signal 322 to the engine control module 34 and/or signal 324 to the hybrid control module 36 that DFCO is enabled and for initiation of a DFCO at the first available opportunity. For example, when the driver of the vehicle 22 lifts their foot off the accelerator, such as sensed by the pedal position sensor 110, and the DFCO execution module 308 has enabled DFCO via the signal(s) 322, 324, the engine control module 34 and/or signal 324 to the hybrid control module 36 may initiate the DFCO.

DFCO may be implemented based on the aforementioned parameters and the engine control module 34 may turn off the injectors 66 stopping the flow of fuel to the cylinders of the engine 52. As a result, the engine 52 spins without firing and operates as an air pump. Pumping air 55 into the high temperature GPF 74 (as warmed herein), spontaneously results in burning off built-up particulate matter in the GPF 74 and delivers a passive regeneration during a normal drive cycle of the vehicle 22, such as while the vehicle 22 is coasting and slowing down with the engine 52 coupled to the driveline 50 through the transmission system 48.

The pedal position sensor 110 signal represents a torque request on the hybrid powertrain 24. While the engine 52 may be prepared for DFCO after the warmup, the hybrid control module 36 arbitrates torque control and ultimately determines whether to maintain operation of the engine 52, and whether the torque request supports DFCO initiation. When the torque command is sufficiently low, and the operation of the vehicle 22 support the DFCO, such as during a coast-down, the DFCO is initiated and the process 400 proceeds to regenerate the GPF 74. The process 400 determines 412 whether the particulate load on the GPF 74 falls to below a regenerated level, meaning the GPF 74 is regenerated, and whether the GPF 74 is below a threshold temperature, indicative of burn-off being complete. The DFCO execution module 308 monitors the ΔP sensor 108 and the GPF temperature sensor 106, and so is also supplied with the signals 312, and 318. The DFCO execution module 308 compares the received values in the signals 312, 318 to thresholds retrieved from the datastore 310 to make the determinations 412. When at least one of the determinations 412 is negative, the process 400 continues in DFCO enable 411. When both determinations 412 are positive, the regeneration is complete and the process 400 ends and is prepared for re-initiation/start 401.

Accordingly, systems and methods provide a mechanism to passively regenerate a GPF without requiring active regeneration cycles, at least during the first 4000 kilometers of operation of a vehicle, and when passive regeneration opportunities might otherwise be unavailable due to the hybrid arrangement of the powertrain. One example involves strong hybrid applications, where deceleration fuel cut-off on cycles might not otherwise occur and as described herein are initiated such as by operating the engine when the hybrid controller would otherwise operate the vehicle electric motor only. The state of the GPF (i.e. particulate loading) determines a need to initiate DFCO. Executing the DFCO means spinning the engine without fuel as an air pump to feed oxygen to the GPF for burning off soot/particulate. The described systems and methods create opportunities under specific calibrated engine operating condition which allow on-cycle regeneration of the GPF to avoid potential Ki factor vehicle certification impacts.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A powertrain system for enabling a regeneration of a gas particulate filter, the powertrain system comprising:
    an exhaust system containing the gas particulate filter, which is configured to collect particulate matter from an exhaust gas stream of the powertrain system;
    a temperature sensor configured to monitor a temperature of the gas particulate filter;
    a loading monitor configured to provide a loading input indicative of particulate loading of the gas particulate filter; and
    at least one controller configured to:
        determine, by comparing the loading input to stored values that are predetermined and indicative of a need for the regeneration of the gas particulate filter, whether the gas particulate filter requires the regeneration;
        determine, whether the temperature of the gas particulate filter is above a calibrated temperature;
        effect a warmup of the gas particulate filter when, based on the comparing the loading input to the stored values, the gas particulate filter requires the regeneration, and when the temperature of the gas particulate filter is above the calibrated temperature, wherein the calibrated temperature is at a level above which the regeneration of the gas particulate filter is effective, after the warmup; and
        initiate the regeneration when a value received from the temperature sensor meets a minimum threshold level after the warmup, wherein the minimum threshold level is where the regeneration of the gas particulate filter is effective after the warmup.

2. The powertrain system of claim 1, further comprising a gasoline engine, wherein the at least one controller is configured, via at least one actuator, to stop fuel flow to the gasoline engine, wherein the gasoline engine is configured to operate as an air pump without fuel in a deceleration fuel cutoff condition when the regeneration is executed.

3. The powertrain system of claim 1, wherein the at least one controller, prior to initiating the regeneration, is configured to:
    determine whether sensor faults are active, including for the temperature sensor and for the loading monitor; and
    determine whether the temperature of the gas particulate filter is above the calibrated temperature where the regeneration of the gas particulate filter is feasible.

4. The powertrain system of claim 1, wherein the at least one controller, prior to initiating the regeneration, is configured to:
    determine, whether a speed of a vehicle in which the powertrain system is disposed is above a minimum speed at which deceleration of the vehicle will result in regeneration of the gas particulate filter.

5. The powertrain system of claim 1, further comprising an engine in the powertrain system, a throttle controlling air supplied to the engine, and at least one injector controlling fuel supplied to the engine wherein the at least one controller is configured to initiate operation of the engine to accelerate the warmup of the gas particulate filter by altering an air/fuel ratio supplied to the engine by operation of the throttle and by operation of the at least one injector, wherein the at least one controller is configured, via at least one actuator and after the warmup, to stop fuel flow to the engine, with the engine configured to operate as an air pump without fuel in a deceleration fuel cutoff condition when the regeneration is executed.

6. The powertrain system of claim 1, further comprising an engine in the powertrain system, and at least one injector controlling fuel supplied to the engine, wherein the at least one controller is configured to initiate operation of the engine to accelerate the warmup of the gas particulate filter by supplying split injections through the at least one injector.

7. The powertrain system of claim 1, further comprising an engine in the powertrain system, and at least one spark plug controlling initiation of combustion in the engine, wherein the at least one controller is configured to initiate operation of the engine to accelerate the warmup of the gas particulate filter by altering timing of the combustion via the at least one spark plug.

8. The powertrain system of claim 1, further comprising an engine in the powertrain system, and valves controlling air supplied to the engine and controlling exhaust from the engine, wherein the at least one controller is configured to initiate operation of the engine to accelerate the warmup of the gas particulate filter by altering phaser angles of the valves.

9. The powertrain system of claim 1, further comprising:
    an internal combustion engine in the powertrain system;
    an electric motor in the powertrain system; and
    a transmission system in the powertrain system for coupling and decoupling the internal combustion engine with a driveline,
    wherein the at least one controller is configured to:
        couple the internal combustion engine with the driveline through the transmission system during the regeneration of the gas particulate filter;
        cutoff fuel to the internal combustion engine by at least one actuator during the regeneration; and
        determine, whether a speed of a vehicle in which the powertrain system is disposed is above a calibrated speed, wherein the calibrated speed is a minimum speed at which deceleration of the vehicle will result in the regeneration of the gas particulate filter during the cutoff of the fuel to the internal combustion engine and during deceleration of the vehicle within which the internal combustion engine is operating.

10. The powertrain system of claim 1, further comprising:
    an internal combustion engine in the powertrain system; and
    an electric motor in the powertrain system,
    wherein the at least one controller is configured to effect the regeneration of the gas particulate filter through a deceleration fuel cutoff of the internal combustion engine.

11. A method of enabling regeneration of a gas particulate filter of a powertrain system by deceleration fuel cutoff, the method comprising:
    collecting, by the gas particulate filter, particulate matter from an exhaust gas stream of the powertrain system;

monitoring, by a temperature sensor, a temperature of the gas particulate filter;
providing, by a loading monitor, a loading input of particulate loading of the gas particulate filter;
determining, by at least one controller comparing the loading input to stored values, whether the gas particulate filter requires the regeneration, where the stored values are predetermined and indicative of a need for the regeneration of the gas particulate filter;
determining, whether the temperature of the gas particulate filter is above a calibrated temperature;
effecting, by the at least one controller, a warmup of the gas particulate filter when the determination shows the gas particulate filter requires the regeneration, based on the comparing the loading input to the stored values, and when the temperature of the gas particulate filter is above the calibrated temperature, where the calibrated temperature is at a level above which the regeneration of the gas particulate filter is effective, after the warmup; and
initiating, by the at least one controller, the regeneration when a value received from the temperature sensor meets a minimum threshold level after the warmup, where the minimum threshold level is where the regeneration of the gas particulate filter is effective after the warmup.

12. The method of claim 11, further comprising: stopping, by the at least one controller via at least one actuator, fuel flow to a gasoline engine; and operating, by the at least one controller, the gasoline engine as an air pump without fuel in a deceleration fuel cutoff condition when the regeneration is executed.

13. The method of claim 11, further comprising:
determining, by the at least one controller prior to initiating the regeneration, whether sensor faults are active, including for the temperature sensor and for the loading monitor; and
determining whether the temperature of the gas particulate filter is above the calibrated temperature where the regeneration of the gas particulate filter is feasible.

14. The method of claim 11, further comprising determining, by the at least one controller and prior to initiating the regeneration, whether a speed of a vehicle in which the powertrain system is disposed is above the speed at which deceleration of the vehicle will feasibly result in the regeneration of the gas particulate filter.

15. The method of claim 11, further comprising:
providing an engine in the powertrain system, with a throttle controlling air supplied to the engine, and injectors controlling fuel supplied to the engine;
initiating, by the at least one controller, operation of the engine to accelerate the warmup of the gas particulate filter by altering an air/fuel ratio supplied to the engine by operation of the throttle and the injectors;
stopping, by the at least one controller via at least one actuator and after the warmup, fuel flow to the engine, with the engine; and
operating, by the at least one controller, the engine as an air pump without fuel in a deceleration fuel cutoff condition when the regeneration is executed.

16. The method of claim 11, further comprising:
providing an engine in the powertrain system with at least one injector;
controlling, by the at least one injector, fuel supplied to the engine;
initiating, by the at least one controller, operation of the engine to accelerate the warmup of the gas particulate filter by supplying split injections through the at least one injector to accelerate the warmup of the gas particulate filter.

17. The method of claim 11, further comprising:
providing an engine in the powertrain system with at least one spark plug;
controlling, by the at least one controller through the at least one spark plug, initiation of combustion in the engine; and
initiating, by the at least one controller, operation of the engine to accelerate the warmup of the gas particulate filter by altering timing of the combustion via the at least one spark plug to accelerate the warmup of the gas particulate filter.

18. The method of claim 11, further comprising:
providing an engine in the powertrain system with valves controlling air supplied to the engine and controlling exhaust from the engine; and
initiating, by the at least one controller, operation of the engine to accelerate the warmup of the gas particulate filter by altering phaser angles of the valves to accelerate the warmup of the gas particulate filter.

19. The method of claim 11, further comprising:
providing an internal combustion engine in the powertrain system;
providing an electric motor in the powertrain system;
providing a transmission system in the powertrain system for coupling and decoupling the internal combustion engine with a driveline;
coupling, by the at least one controller, the internal combustion engine with the driveline through the transmission system during the regeneration of the gas particulate filter;
cutting off fuel to the internal combustion engine by at least one actuator during the regeneration; and
determining whether a speed of a vehicle in which the powertrain system is disposed is above a calibrated speed, wherein the calibrated speed is a minimum speed at which deceleration of the vehicle will result in the regeneration of the gas particulate filter during the cutting off of the fuel to the internal combustion engine and during deceleration of the vehicle within which the internal combustion engine is operating.

20. A vehicle comprising:
a hybrid powertrain including an internal combustion engine and an electric motor; an exhaust system extending from the internal combustion engine;
a gas particulate filter disposed in the exhaust system to collect particulate matter;
a temperature sensor configured to monitor a temperature of the gas particulate filter;
a loading monitor configured to provide a loading input of particulate loading of the gas particulate filter; and
at least one controller configured to:
determine, by comparing the loading input to stored values, whether the gas particulate filter requires a regeneration, wherein the stored values are predetermined and indicative of a need for the regeneration of the gas particulate filter;
effect a warmup of the gas particulate filter when the determination is that the gas particulate filter requires the regeneration;
initiate the regeneration when a value received from the temperature sensor meets a minimum threshold level after the warmup wherein the minimum threshold level is where the regeneration of the gas particulate filter is effective after the warmup;

enable the regeneration of the gas particulate filter by deceleration fuel cutoff, where the internal combustion engine is a gasoline engine operated as an air pump to supply oxygen to the gas particulate filter; and stop, via at least one actuator and after the warmup, fuel flow to the internal combustion engine, with the gasoline engine configured to operate without fuel in the deceleration fuel cutoff when the regeneration is executed.

* * * * *